United States Patent [19]
Look et al.

[11] Patent Number: 5,387,927
[45] Date of Patent: Feb. 7, 1995

[54] METHOD AND APPARATUS FOR BROADBAND TRANSMISSION FROM A CENTRAL OFFICE TO A NUMBER OF SUBSCRIBERS

[75] Inventors: Christopher M. Look, Coquitlam; Joe Geofroy; Piyush B. Kothary, both of Burnaby, all of Canada

[73] Assignee: MPR Teltech Ltd., Burnaby, Canada

[21] Appl. No.: 122,298

[22] Filed: Sep. 17, 1993

[51] Int. Cl.[6] .................................... H04M 11/00
[52] U.S. Cl. ............................... 348/6; 348/7; 455/3.1; 455/4.1; 455/4.2
[58] Field of Search .............. 358/86, 85; 379/53, 379/94; 348/6, 7, 13, 14, 16, 17; 455/4.1, 4.2, 5.1, 6.1, 6.2, 6.3, 3.1

[56] References Cited
U.S. PATENT DOCUMENTS

| | | | |
|---|---|---|---|
| 5,136,411 | 8/1992 | Park et al. | 358/86 |
| 5,153,763 | 10/1992 | Pidgeon | 358/86 |
| 5,245,420 | 9/1993 | Harney et al. | 358/86 |

Primary Examiner—Curtis Kuntz
Assistant Examiner—Stella L. Woo
Attorney, Agent, or Firm—Myers, Liniak & Berenato

[57] ABSTRACT

A method of transmitting broadband video services from a broadband digital signal source which includes forming the digital signal from said source into a plurality of channels of digital signals and modulating a plurality of carrier signals with respective channels of the digital signals. The resultant modulated channels are multiplexed to form a combined signal which is then used to modulate light from a laser light source. The modulated light signal is transmitted along a light fibre to a local distribution box where it is converted to electrical signals and broadcast to a number of subscriber set top terminals, Each set top terminal detects the modulated signal of a channel pre-assigned to that set top terminal. User control information is also received by that set top terminal and transmitted to the central office.

18 Claims, 6 Drawing Sheets

METHOD AND APPARATUS FOR BROADBAND TRANSMISSION FROM A CENTRAL OFFICE TO A NUMBER OF SUBSCRIBERS

FIELD

The present invention relates to a method and apparatus for the transmission of broadband information from a central office to a number of residential subscribers and from each subscriber to the central office in a way that allows reuse of a portion of the existing twisted pair distribution lines that have been used to provide conventional telephone service.

BACKGROUND

With the expanding usage of fibre optic cable for voice, video and data transmission there has developed an increased demand for systems for delivery of broadband services to residential living units. Presently, cable systems bring audio/video television signals to each residence via coaxial cable in a "tree and branch" architecture. In such an architectural arrangement the same information on the coaxial line is shared amongst the designated residences. All signals are transmitted to each subscriber. A given subscriber can select from this group of pre-determined signals. Such distribution does not at present bring signals containing information requested by specific residences in response to information sent over the same lines by the subscriber. A second problem with using existing cable techniques is that transmitting multi-channel analog video signals over fibre optic cables requires expensive lasers.

Since telephone companies are in the process of laying fibre optic cable to selected sites as the economies permit, it is of interest to such companies to utilize these existing twisted pair installations in the most effective and economical ways possible. Since the most expensive part of a fibre optic system is in the optical to electronic interface equipment, it makes sense to seek ways of minimizing any new installations of such equipment where possible. In addition, it is also desirable to seek ways of phasing in the number of optoelectronic devices as the number of subscribers increases.

In delivering such transmissions it would be possible to use a broadband digital transmission. Current STS-3 standards require a line rate of 155 megabits per second (Mb/sec). The bandwidth required for such a rate is about 90 MHz. Operating from zero to 90 MHz includes the 54 to 88 MHz broadcast TV and 88 to 108 MHz FM channels for radio transmission which would give strong interference. Moreover, the increase of loss or attenuation with frequency would require equalization to provide a flat response as well as adaptive filtering, both of which would be expensive. The electronics to deal with such a high frequencies would be expensive and the effective noise would be significantly increased by the strong interference of the existing broadcast sources.

Accordingly, it is an object of the invention to provide a fibre optic system for delivering broadband services to customers which is relatively low cost and can be expanded as the number of subscribers increases.

SUMMARY OF THE INVENTION

According to the invention there is provided a system for delivering broadband services from a telephone central office to a plurality of customers. The system includes a subscriber set top terminal at the location of the subscriber. Channelizing means is provided for forming the signal from the source into a plurality of channels each of a characteristic frequency and with signals for each channel having control bits and payload bits wherein the control bits identifies for each subscriber that portion of the payload intended for that subscriber. A multiplexer and transmitter transmits the signal from the box to each set top terminal. The set top terminal detects a selected channel of information which it processes. It also transmits user control information to the twisted pair through the distribution box, optical fibres and to the central office.

The channels may each have a 6 MHz bandwidth and the entire bandwidth may be 90 MHz. By selecting such channels one can avoid the interference caused by strong broadcast sources as well as reduce the need to compensate for the whole 90 MHz bandwidth.

Preferably, the transmission line is a twisted copper pair. Utilizing a twisted copper pair allows up to 100 MHz frequency of transmission before permitted rates of radiative emissions are exceeded. Moreover, public telephone companies have twisted copper pairs going from distribution boxes to residential subscribers already in place to carry conventional telephone signals.

The channelizing means may include a modulator for modulating a plurality of carrier frequencies with digital signals corresponding to the channels. The transmitter may include a multiplexer for multiplexing together the modulated channel signals to form a combined signal and light modulator for modulating laser light in response to the combined multiplexed channel signals.

Preferably, each channel of data is transmitted over the fibre pair with frames in Sonet format. However, the Sonet frames may be transmitted at a rate of substantially less than 51.85 Mbps. Use of Sonet frames, even though at non-standard speeds, provides compatibility with the data transmission systems of public telephone companies.

Advantageously, the modulator may employ an M-ary modulation scheme. Such a scheme increases the rate of transmission of data in each channel.

According to another aspect of the invention there is provided a method of transmitting broadband video services from a broadband digital signal source which includes forming the digital signals from said source into a plurality of channels of digital signals. Each channel of digital signals is used to modulate a carrier signal and the resultant modulated set of carrier signals is then multiplexed into a combined signal. The combined signal is transmitted to a local distribution box. The modulated signals are broadcast to a number of set top terminals. Each set top terminal is tuned to a particular carrier signal and detects the modulating digital signal for that channel. User input is received by the set top terminals and transmitted to the central office.

Preferably, the combined signal is used to modulate light from a laser source which is then transmitted along optical fibre to the distribution box where it is converted to electrical signals. Similarly, electrical signals received from the set top terminals modulate light from a laser source which is sent along another optical fibre to the central office wherein it is converted to electrical signals.

The frequency of the carriers may be less than 90 MHz and the rate of transmission in each channel may be approximately 20 Mbit/sec.

Using the above method and apparatus, video, data and voice may be multiplexed together at the central office in 6 MHz channels. The signals may be transmitted in Sonet frames having virtual tributaries (or VT pipes) and/or ATM cells mapped onto the Sonet frames. Thus, the channels may be dynamically assigned to selected ones of the set top terminals.

BRIEF DESCRIPTION OF THE DRAWINGS

The novel features which are believed to be characteristic of the invention are set forth in the appended claims. The invention itself, as well as other features and advantages thereof, will be best understood by reference to the description which follows read in conjunction with the accompanying drawings, wherein:

DETAILED DESCRIPTION WITH REFERENCE TO THE DRAWINGS

Figure 1:
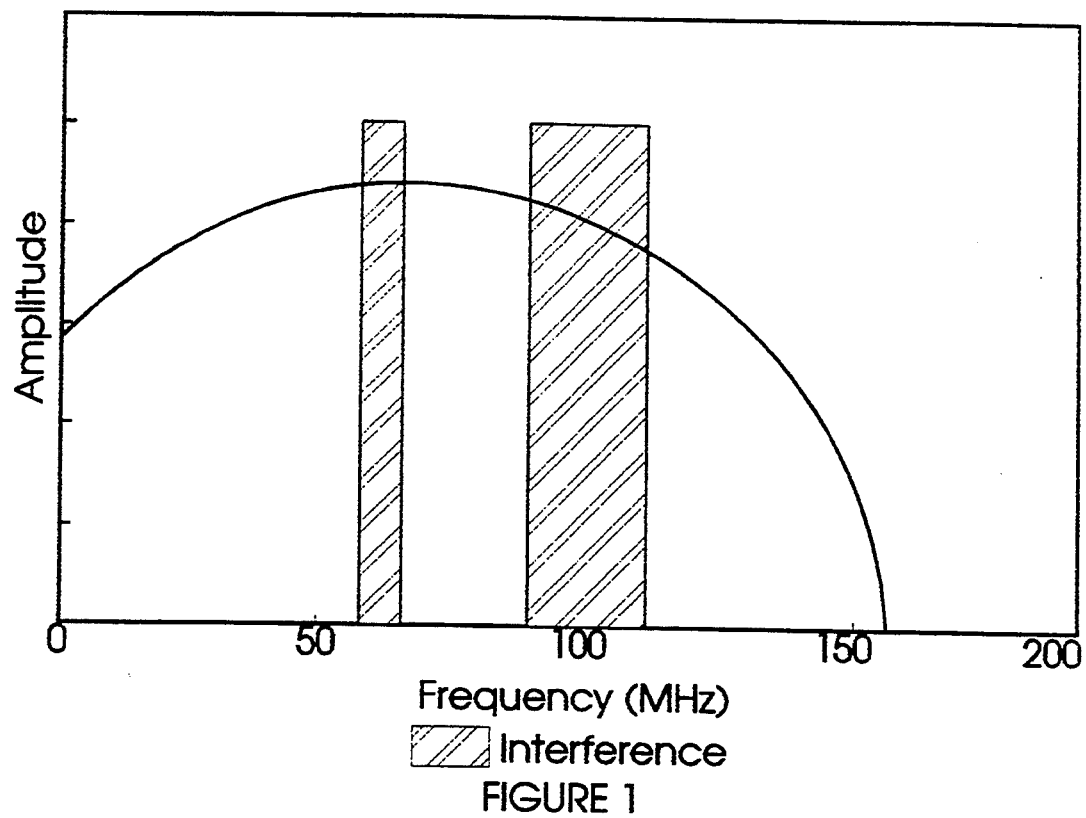
FIG. 1 is a graph of the power spectral density of an STS-3 line signal.
Figure 2:
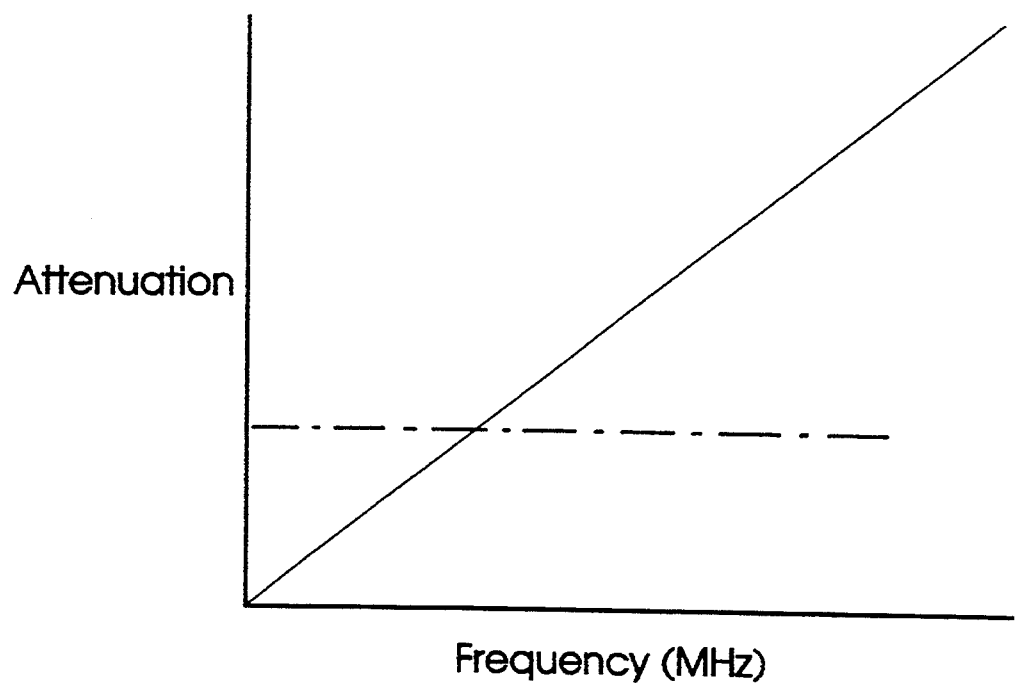
FIG. 2 is a graph of the loss or attenuation of electrical signals as a function of frequency showing interference bands at 60 MHz and 88–90 MHz.
Figure 3:
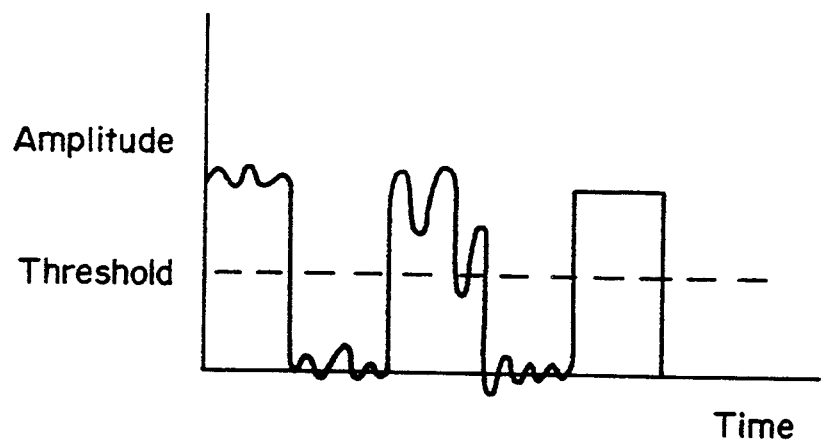
FIG. 3 is a waveform of digital signals transmitted at the rate of 155 Megabits/sec along a twisted copper pair showing interference and the threshold level.

Referring to FIG. 1 there is shown a power spectral density of an STS-3 electrical signal. The signal can be low pass filtered at 90 MHz. The latter figure corresponds to about 0.6 times the standard STS-3 rate of 155 Mb/sec. Also, shown in the shaded section is potential interference from existing broadcast sources. FIG. 2 is curve of loss or attenuation of the signal as a function of frequency. It will be observed that the loss increases as a function of frequency. In order to have an acceptable delivery system, the loss curve should be horizontal so that it affects all frequencies equally. Such compensation is expensive for such a wide band as is the adaptive filtering which is also required. FIG. 3 shows the digital signals at 155 Mb/sec and the interference caused by noise. Once noise causes the signal to dip below the threshold when transmitting a "1", the circuit is unable to determine whether there has been a "1" or a "0".

Figure 4:
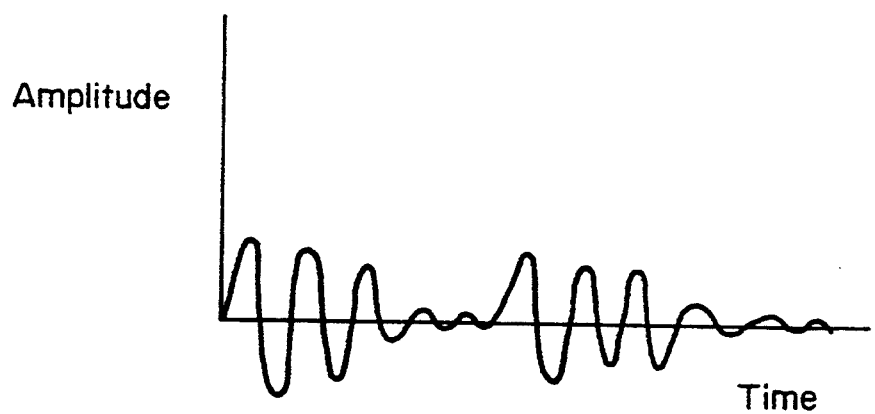
FIG. 4 is waveform showing transmission of a carrier at 40 MHz in digital form showing alternate 1's and 0's.
Figure 5:
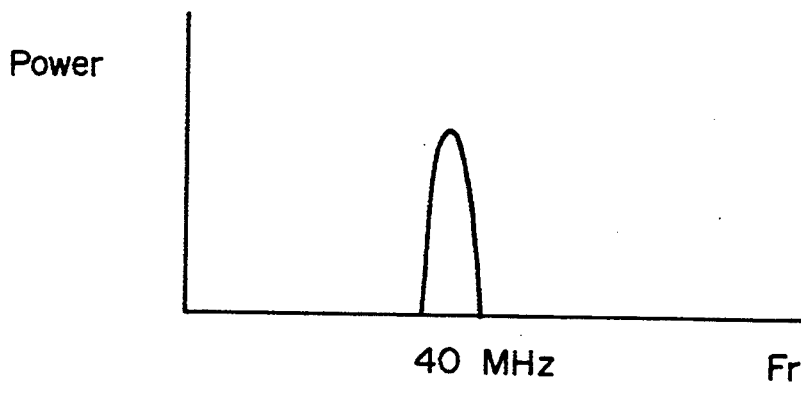
FIG. 5 shows the power spectrum of the signal of FIG. 4 centered around the carrier at 40 MHz.

By utilizing a number of 6 MHz channels one can avoid the interference caused by strong broadcast sources such as 54 to 88 MHz TV channels and 88–108 MHz FM channels as well as reduce the need to compensate for the whole 90 MHz bandwidth. For each 6 MHz band up to 20 Mb/sec can be transmitted. Thus, 7 or 8 channels are required to transmit all of the data at the 155 Mb/sec rate. One feasible form of such is shown in FIG. 4 which short bursts of modulated carrier signal are transmitted which correspond to the 1's and 0's of the digital data. The power spectral density, if the carrier frequency for a particular 6 MHz channel is 40 MHz, is shown in FIG. 5. Each signal is modulated with one or more of the 7 or 8 different carriers prior transmission and detected at the receiving end by a tuner which tunes to that frequency.

Figure 6:
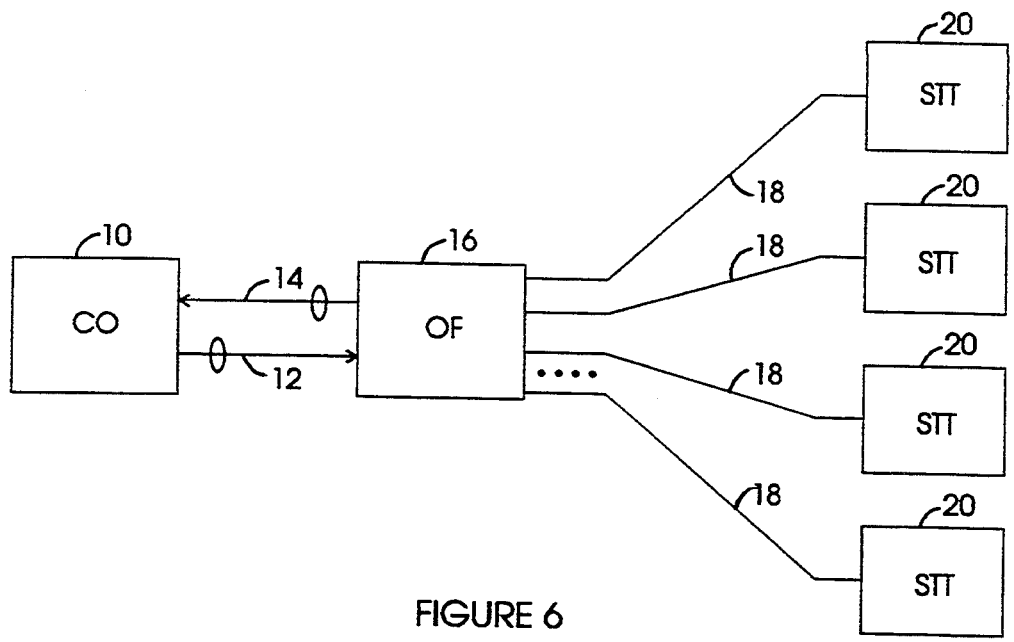
FIG. 6 is a schematic drawing showing a residential broadband distribution system.

An installation for delivery of broadband services to residential subscribers shown in FIG. 6 includes a central office (CO) 10 which transmits channels of digital information down a fibre optic cable 12 in Sonet frames to an outside box (OF) 16 located near a number of subscriber receiving or set-top terminal units (STT) 20. Digital information is also sent from the outside box 16 along fibre optic cable 14 to the central office 10. The outside box 16 receives the information from cable 12, converts it to electrical signals, strips off and processes the Sonet control channels from the Sonet frame, and broadcasts the information along corresponding twisted pairs of copper wires 18 leading to the various subscribers. The twisted pairs will permit frequencies of up to 100 MHz to be transmitted without exceeding permitted radiative emission levels while maintaining sufficient signal integrity for virtually error free transmission. Moreover, such pairs already exist as a part of standard public telephone installations and can be utilized without further installation expense.

Figure 7:
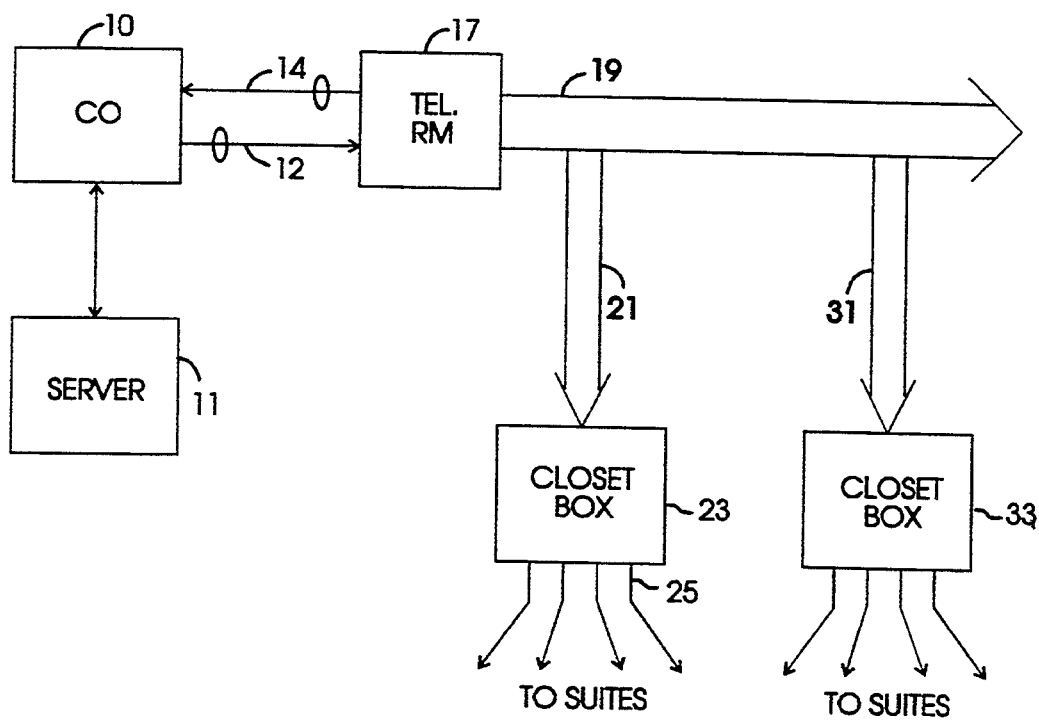
FIG. 7 is a schematic drawing showing a broadband distribution system to a multi-tenanted building.

Referring to FIG. 7 there is shown a system equivalent to that of FIG. 6 but for a multi-tenanted building. In this case the fibres 12 and 14 go directly to a telephone room 17 usually in the basement of the building (not shown). A server 11 is shown remote from the central office 10 but can also be co-located. The server 11 can be, for example, a storage and delivery source for movies. From the telephone room 17 there are 50 or 100 pair feeder lines 19 running to a first closet 23. Lines 25 which are terminated in the closet box 23 are then run to every suite, with each suite receiving 2 to 10 pair feed lines. The latter lines for each suite run to a box and from there to each jack in the suite (not shown). A portion of the remainder of lines 19 go to a second closet box 33 which is typically 2 to 4 floors higher.

All information sent over the fibre optic cables 12 and 14 is digitized and sent in several multiplexed 6 MHz channels. Given the 100 MHz frequency limitation of the twisted pairs, the number of 6 MHz channels that may be employed is only 10 to 15. By employing a modem using, for example quadrature amplitude modulation, 20 Megabits per second (Mbps) or more for each 6 MHz band over the fibre may be transmitted, the rate required by high definition television (HDTV).

Figure 8:
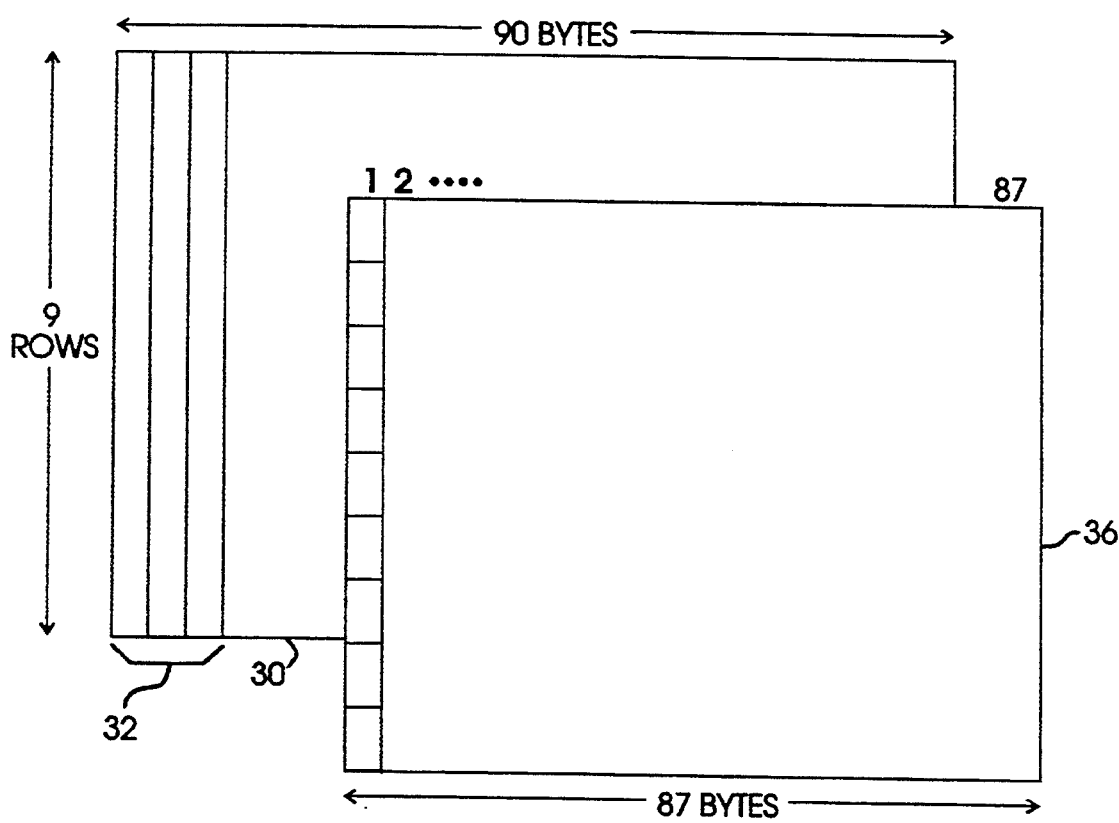
FIG. 8 is a schematic drawing showing a Sonet frame of information and control bits.

Telephone companies send data in accordance with Sonet standards at line rates which are in multiples of 51.85 Mb/sec. The present embodiment uses Sonet frames for each channel but with a lower line rate since each channel can accommodate only approximately 20 Mbps. This allows the controls and alarms contained in the header to be used, the same definitions for mapping virtual tributaries or ATM cells into the Sonet frames to be used and allows compatibility with the operating systems of public telephone companies. FIG. 8 shows the size and structure of a Sonet frame. The frame consists of 90 columns of bytes with 9 bytes in each column. The first three columns 32 contain control bits while the remaining columns 36 contain the data payload. The control bits and parts of the data payload for a particular channel Sonet frame can be used to dynamically re-assign segments of data to a subscriber based upon need. Although a variety of formats for mapping can be used, virtual tributaries (VT) and asynchronous transfer mode (ATM) are the ones chosen for the present embodiment. Each subscriber's set top terminal is instructed as to which portion of the data is intended for that subscriber.

Figure 9:
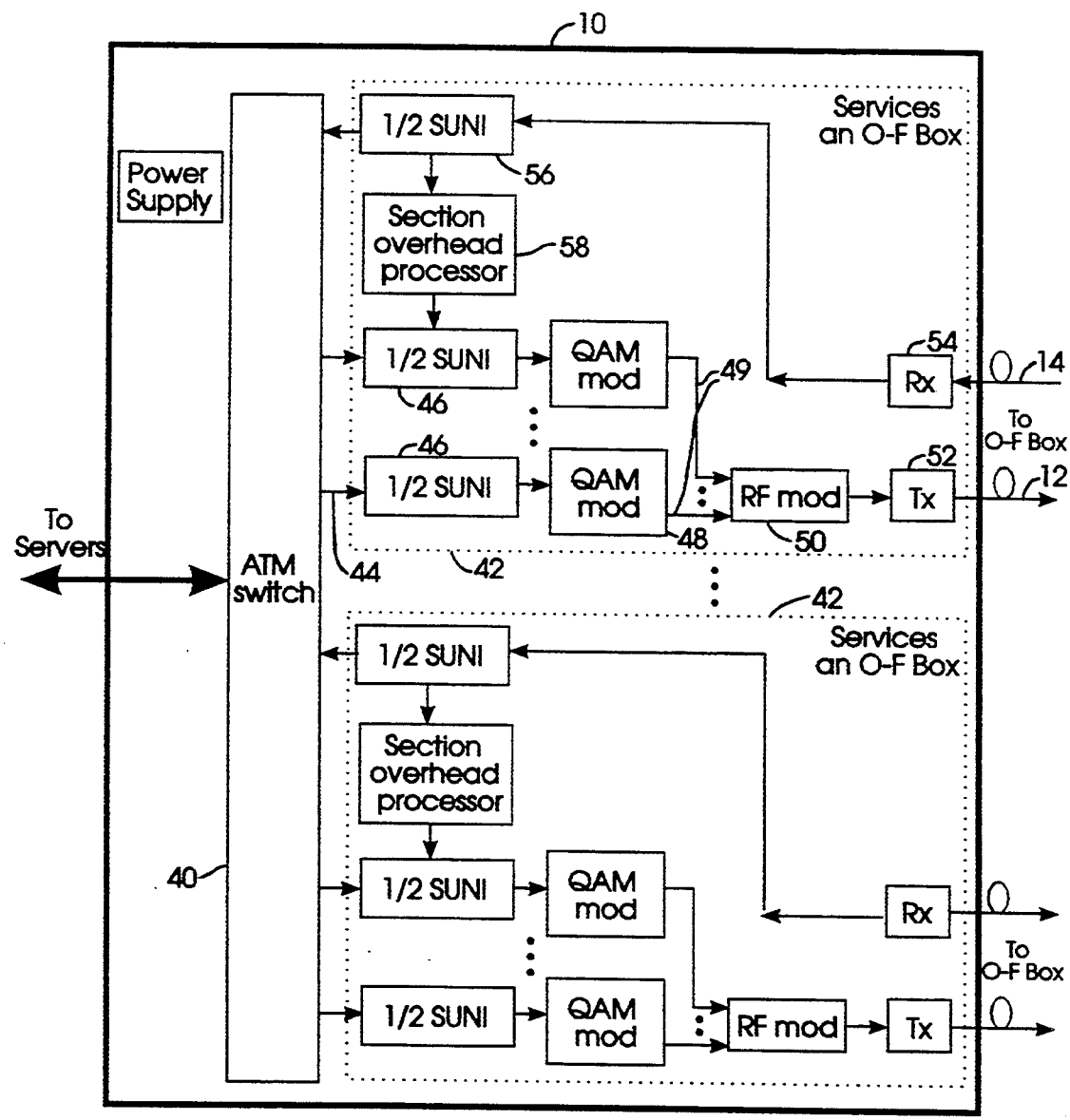
FIG. 9 is a schematic drawing showing a segment of a central office installation for transmitting and receiving the digital information along fibre optic cable to an outside box.

Referring to FIG. 9 there is shown the modifications to a segment of a conventional central office needed to implement the system. In this case signals from a network server 11 or other source are multiplexed and routed by an ATM switch 40. The ATM switch 40 has several output ports 44. Each output port 44 provides a 20 Mb/sec digital signal in ATM cell format. The latter signal is first added with SONET "overhead" bits by an ATM to Sonet transceiver one source of which is a PM5345 SUNI chip 46 designed and supplied by PMC-Sierra, Inc. of Burnaby, British Columbia, Canada. The resulting digital signal is then quadrature amplitude modulated by a 16-QAM modulator. The resulting modulated signal is directed along line 49 to an RF modulator 50 which modulates each QAM channel with different carriers, one carrier for each channel. The RF modulated signal is then used to modulate a laser light signal 52 which is sent down optical fibre 12 to the outside box 16.

Digital light signals arriving on fibre 14 are directed to receiver 54 wherein the digital signal is detected and sent to ½ a SUNI chip 56 and overhead processor 58 which checks the "overhead" control bits and directs the frame into the ATM switch 40.

Figure 10:
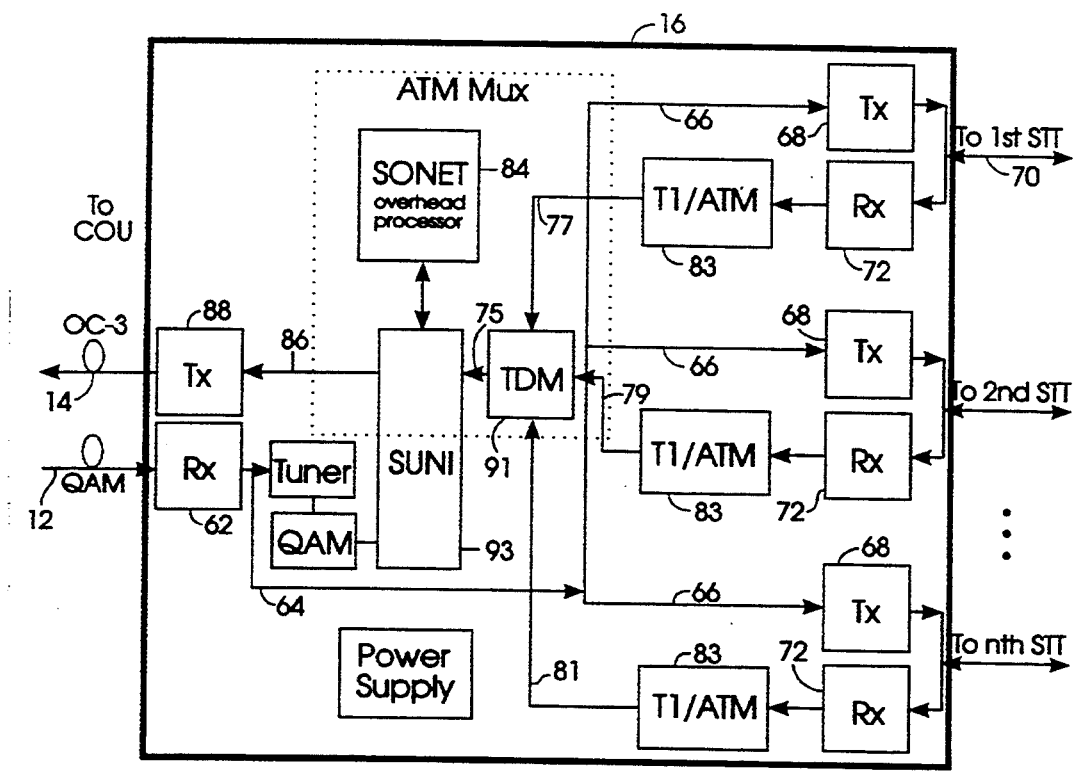
FIG. 10 is a schematic drawing showing an outside box.

Referring to FIG. 10 there is shown a schematic circuit diagram of an outside box 16. Modulated light signals corresponding to multi-channel QAM signals travelling down fibre 12 are directed to receiver 62 where they are converted to electrical signals and sent to transmitters 68 which transmit the signals along twisted pairs 70 to subscriber "set-top terminals" 20.

Similarly, T1 digital electrical signals received from set top terminals over twisted pairs 70 enter receivers 72 and into T1/ATM units 83 which extract the ATM cells place them on output lines 77, 79 and 81 which directs them to the time division multiplexer (TDM) 91. The TDM 91 feeds the multiplexed signal to the ½ Suni chip 93. The time division multiplexer 91 controls which T1/ATM unit 74 has access to the Suni chip 93 at any given time. The signals produced are converted to light and transmitted over optical fibre 14 by the transmitter 88 to the central office 10.

Figure 11:
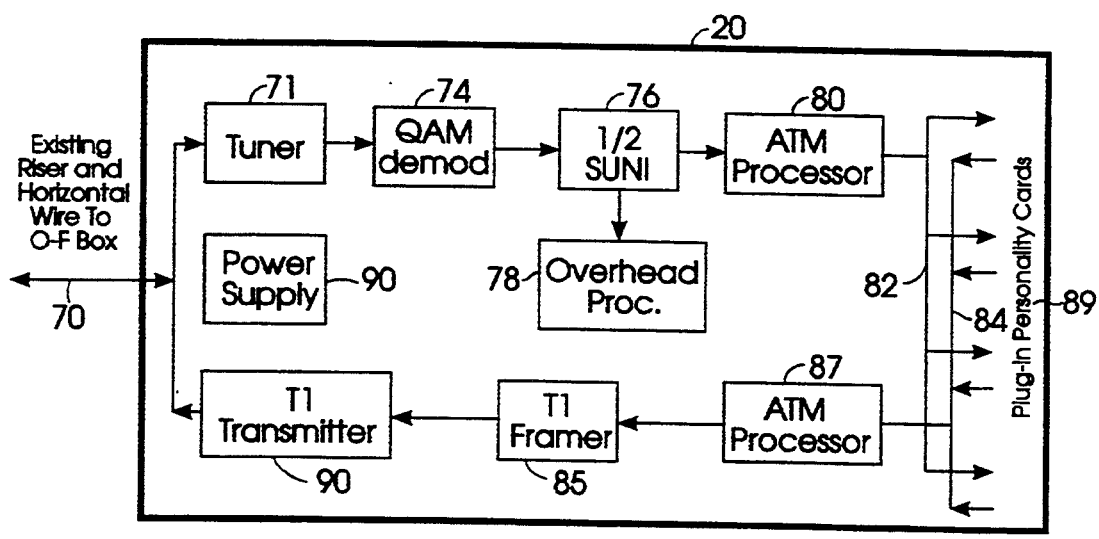
FIG. 11 is a schematic drawing showing a set-top terminal installation of a subscriber.

Referring to FIG. 11 there is shown a schematic diagram of a set top terminal 20. In the STT, the QAM carriers (up to 15) each with 16-QAM using 6 MHz are received from the outside box 16. A tuner 72 demodulates a carrier and sends a 6 MHz QAM signal to the QAM demodulator 74. The demodulator 74 demodulates the 6 MHz signal into a 20 Mbps digital signal. This signal is subsequently sent to ½ a Suni chip 76 and overhead processor 78 which checks the "overhead" control bits. From there, an ATM processor is used to strip the headers from the 20 Mbps signal and routes the remaining 48 bytes of the cells to appropriate plug-in personality cards 89. The personality cards 89 perform functions such as video decompression, IR remote control, mouse processing, data interface, etc. They are designed as plug-in cards so that each subscriber can customize the functionality of the STT. The upstream 48 byte ATM cells from each personality card 89 are multiplexed by the ATM processor 87 fed to T1 framer 85 where the ATM cells are mapped into a T1-like frame and transmitted by transmitter 90 back over twisted pair 70 to the outside box 16.

Obviously, various modulation schemes are possible. By using a multilevel modulation scheme such as M-ary a higher bit rate is possible for each 6 MHz channel.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modification or embodiments as fall within the true scope of the invention.

We claim:

1. A system for delivering broadband services from a broadband digital data signal source via a telephone central office to a subscriber, comprising:
   (a) a subscriber set top terminal at the location of the subscriber;
   (b) channelizing means for forming the signal from said source into a plurality of channels each of a characteristic channel center frequency and with the signals for each channel having control bits and payload bits wherein the control bits identify for each subscriber that portion of the payload bits intended for that subscriber;
   (c) a multiplexer and transmitter for transmitting the channel signals from the central office to a local distribution box;
   (d) a signal distribution system at said local distribution box operative to receive signals transmitted by said transmitter and direct them to one or more subscriber set top terminals;
   (e) a pair of fibre optic lines coupled between said transmitter and said receiver for carrying signals therebetween; and
   (f) a transmission line between said distribution box and said set top terminals;
   wherein said set top terminal is operative to detect a selected channel of data and process said data and to transmit user control information to said box, along said transmission line to said central office.

2. A system according to claim 1, wherein said transmission line is a twisted copper pair.

3. A system according to claim 1, wherein said channelizing means includes a modulator for modulating a plurality of carrier frequencies with digital signals corresponding to said channels.

4. A system according to claim 3, wherein said transmitter includes a multiplexer for multiplexing together the modulated channel signals to form a combined signal and light modulator for modulating laser light in response to the combined multiplexed channel signals.

5. A system according to claim 1, wherein each channel of data is transmitted over said fibre pair with frames in Sonet format.

6. A system according to claim 5, wherein said Sonet frames are transmitted at a rate of substantially less than 51.85 Mbps.

7. A system according to claim 3, wherein said modulator employs an M-ary modulation scheme.

8. A system for delivering broadband services from a broadband digital signal source via a telephone central office to a subscriber set top terminal, comprising:

(a) means for modulating carrier signals selected frequencies with signals from said signal source, said carriers corresponding to respective ones of a plurality of channels;

(b) optical fibres coupling the central office to an outside signal receiving installation;

(c) means for multiplexing the modulated channel signals into a combined signal and converting the combined signal into a modulated light signal and directing the light signal down one of said fibres;

(d) means for converting the modulated light into electrical signals;

(e) a twisted copper pair connected between said light converting means and the subscriber set top terminal;

(f) a transmitter coupled to said twisted copper pairs for transmitting said converted electrical signals to the subscriber set top terminal; and (g) means for transmitting electrical signals from the subscriber set top terminal to the central office over said twisted pair and another of said optical fibres;

wherein said signal source places control bits and payload bits in each channel wherein the control bits identify to each set top terminal the portion of the payload bits for that set top terminal and processes subscriber input data into frames and transmits the frames.

9. A system according to claim 8, wherein video, data and voice are multiplexed together at the central office and modulated into 6 MHz channels.

10. A system according to claim 8, wherein the broadband signals are mapped into Sonet frames using virtual tributaries and ATM.

11. A system according to claim 8, wherein said Sonet frames are transmitted at a rate of substantially less than 51.85 Mbps.

12. A system according to claim 8, wherein said modulator employs an M-ary modulation scheme.

13. A method of transmitting broadband video services from a broadband digital signal source, comprising:

(a) forming the digital signal from said source into a plurality of channels of digital signals including control bits and payload bits, wherein the control bits identify to each set top terminal the portion of the payload bits destined for that set top terminal;

(b) modulating a plurality of carrier signals with said respective channels of digital signals;

(c) multiplexing the modulated signals to form a combined signal;

(d) transmitting the combined signal to a local distribution box;

(e) broadcasting the electrical signal to a number of set top terminals wherein each set top terminal detects a corresponding channel; and (f) generating in the set top terminal control signals in response to user input and transmitting the control signals to the central office.

14. A method according to claim 13, including modulating light from a laser light source with the combined signal and transmitting the modulated light along one of a pair of light fibres to the distribution box and converting the modulated light to electrical signals.

15. A method according to claim 13, wherein said channels of data are formed into Sonet frames prior to transmission down the light fibre.

16. A method according to claim 13, wherein the rate of transmission of the digital signals in each channel is between 6 Mbit/sec and 50 Mbit/sec.

17. A method according to claim 13, wherein the signal from said local distribution box is broadcast along twisted pairs of copper conductors toward associated ones of said set top terminals.

18. A method according to claim 13, wherein M-ary modulation of said digital signal is employed.

* * * * *